(12) United States Patent
Itou et al.

(10) Patent No.: US 9,618,082 B2
(45) Date of Patent: Apr. 11, 2017

(54) WORM GEAR

(71) Applicant: MABUCHI MOTOR CO., LTD., Matsudo (JP)

(72) Inventors: Kiyoto Itou, Matsudo (JP); Kazuyuki Yamamoto, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 126 days.

(21) Appl. No.: 14/184,545

(22) Filed: Feb. 19, 2014

(65) Prior Publication Data

US 2014/0165760 A1 Jun. 19, 2014

Related U.S. Application Data

(63) Continuation of application No. PCT/JP2012/006916, filed on Oct. 29, 2012.

(30) Foreign Application Priority Data

Nov. 4, 2011 (JP) .................................. 2011-242639

(51) Int. Cl.
| | | |
|---|---|---|
| F16H 1/16 | (2006.01) | |
| F16H 55/08 | (2006.01) | |
| F16H 57/04 | (2010.01) | |

(52) U.S. Cl.
CPC ............ *F16H 1/16* (2013.01); *F16H 55/0853* (2013.01); *F16H 57/0464* (2013.01); *F16H 57/0498* (2013.01); *Y10T 74/19828* (2015.01)

(58) Field of Classification Search
CPC ........................................................ F16H 1/16
See application file for complete search history.

(56) References Cited

U.S. PATENT DOCUMENTS 5,970,808 A    10/1999 Oosterhuis et al.
2014/0318289 A1* 10/2014 Tanaka et al. ............... 74/89.14

FOREIGN PATENT DOCUMENTS

| CN | 1463210 A | 12/2003 |
|---|---|---|
| JP | 08-086347 A | 4/1996 |
| JP | 9-024855 | 1/1997 |
| JP | 924855 A | 1/1997 |
| JP | 2003-065422 | 3/2003 |
| JP | 2005-30545 | 2/2005 |
| JP | 2005-231388 | 9/2005 |
| JP | 2006-342971 | 12/2006 |
| JP | 2007-99229 | 4/2007 |
| JP | 2007-321812 | 12/2007 |

(Continued)

OTHER PUBLICATIONS

International Search Report in corresponding PCT Application No. PCT/JP2012/006916, dated Nov. 27, 2012.

(Continued)

*Primary Examiner* — Terence Boes
(74) *Attorney, Agent, or Firm* — Schwabe Williamson & Wyatt PC

(57) ABSTRACT

A worm gear includes a worm formed with a through hole through which a shaft transmitting the rotation of a motor is inserted, and a worm wheel configured to mesh with the worm and transmit the rotation to an output shaft. Given that a normal pitch is denoted by E and a width of a recess in the direction of a worm axis by H, the worm is configured such that $H/E \geq 0.6$ (1) is met.

10 Claims, 13 Drawing Sheets

(56) References Cited

FOREIGN PATENT DOCUMENTS

| JP | 2009-126328 | 6/2009 |
| JP | 2011-144837 | 7/2011 |
| WO | 2011-114642 | 9/2011 |
| WO | 2011114642 A1 | 9/2011 |

OTHER PUBLICATIONS

Japanese Office Action for JP 2011-242639, issued Jul. 21, 2015 (with English translation).
Chinese Search Report for CN 2012800396525, issued Aug. 10, 2015 (with English translation).
International Preliminary Report on Patentability and Written opinion in PCT/JP2012/006916, mailed Nov. 27, 2012, 7 pages, translated.
International Preliminary Report on Patentability and Written opinion in PCT/JP2012/006916, mailed Nov. 27, 2012, 6 pages, untranslated.
Japanese Office Action for JP 2011-242639, issued Jul. 19, 2016 (with English translation).
German Patent Application No. 11 2012 004 609.9 Office Action dated May 31, 2016, 11 pages with English translation.
Japanese Application No. 2011-242639 Office Action dated Feb. 16, 2016, 8 pages with English translation.

\* cited by examiner

30

30

WORM GEAR

CROSS-REFERENCE TO RELATED APPLICATIONS

This application is a continuation of International Application No. PCT/JP2012/006916, filed on Oct. 29, 2012, which claims the benefit of Japanese Patent Application No. 2011-242639, filed on Nov. 4, 2011, the entire content of each is incorporated herein by reference.

BACKGROUND OF THE INVENTION

Field of the Invention

The present invention relates to a worm gear applicable to a reducer of member opened or closed by power, and, for example, to a worm gear of a reducer used to open or close a power window or a sunroof of a vehicle.

Description of the Related Art

Motors provided with a reducer including a worm and a worm wheel are conventionally known as a mechanism to drive the power window of a vehicle. Normally, a gear mesh between a worm and a worm wheel is filled with a lubricant such as grease in order to reduce abrasion between teeth.

It is desirable that the lubricant remain in the gear mesh for a long period time and even in the presence of a change in the environment in which the lubricant is used. For example, there is proposed a worm having a tooth face with a recess for retaining a lubricant (see patent document 1). The document describes the worm in which such a configuration is employed as being characterized by improved lubrication between tooth faces and reduced abrasion on the tooth faces pressed into contact with each other as the worm and the worm wheel mesh with each other.

[patent document 1] JP2003-65422

When the motor is not driven, grease is located evenly on the right side and on the left side of the tooth of the worm wheel. The motor repeats normal rotation (CW) or reverse rotation (CCW) depending on the use. For this reason, "the right side of the tooth of the worm" and "the left side of the tooth of the worm wheel" are in contact with each other as the motor is driven to a reverse rotation. As a result, the thickness of the grease in this part of the assembly will be reduced. The grease will flow from where its thickness is reduced toward "the right side of the tooth of the worm wheel" via the grease pool of the worm gear. On the other hand, when the motor is driven to a normal rotation, "the left side of the tooth of the worm" and "the right side of the tooth of the worm wheel" are in contact with each other. As a result, the thickness of the grease in this part of the assembly will be reduced. The grease will flow from where its thickness is reduced toward "the left side of the tooth of the worm wheel" via the grease pool of the worm gear.

Normally, a suitable backlash exists between "the tooth of the worm" and "the tooth of the worm wheel". Therefore, the flow of grease as described above can be maintained. However, depending on the condition or environment in which the motor is used, the backlash may be reduced, the volume of grease may be reduced, or the quality of the grease may become poor so that the proper flow of grease may not be maintained.

SUMMARY OF THE INVENTION

The present invention addresses this issue and a purpose thereof is to provide a technology capable of properly maintaining the lubricant located between the worm and the worm wheel of a reducer.

In order to address the problem, the worm gear according to at least one embodiment of the present invention comprises a worm formed with a through hole through which a shaft transmitting the rotation of a motor is inserted, and a worm wheel configured to mesh with the worm and transmit the rotation to an output shaft. Given that a normal pitch is denoted by E and a width of a recess in the direction of a worm axis by H, the worm is configured such that (expression 1) $H/E \geq 0.6$ is met.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
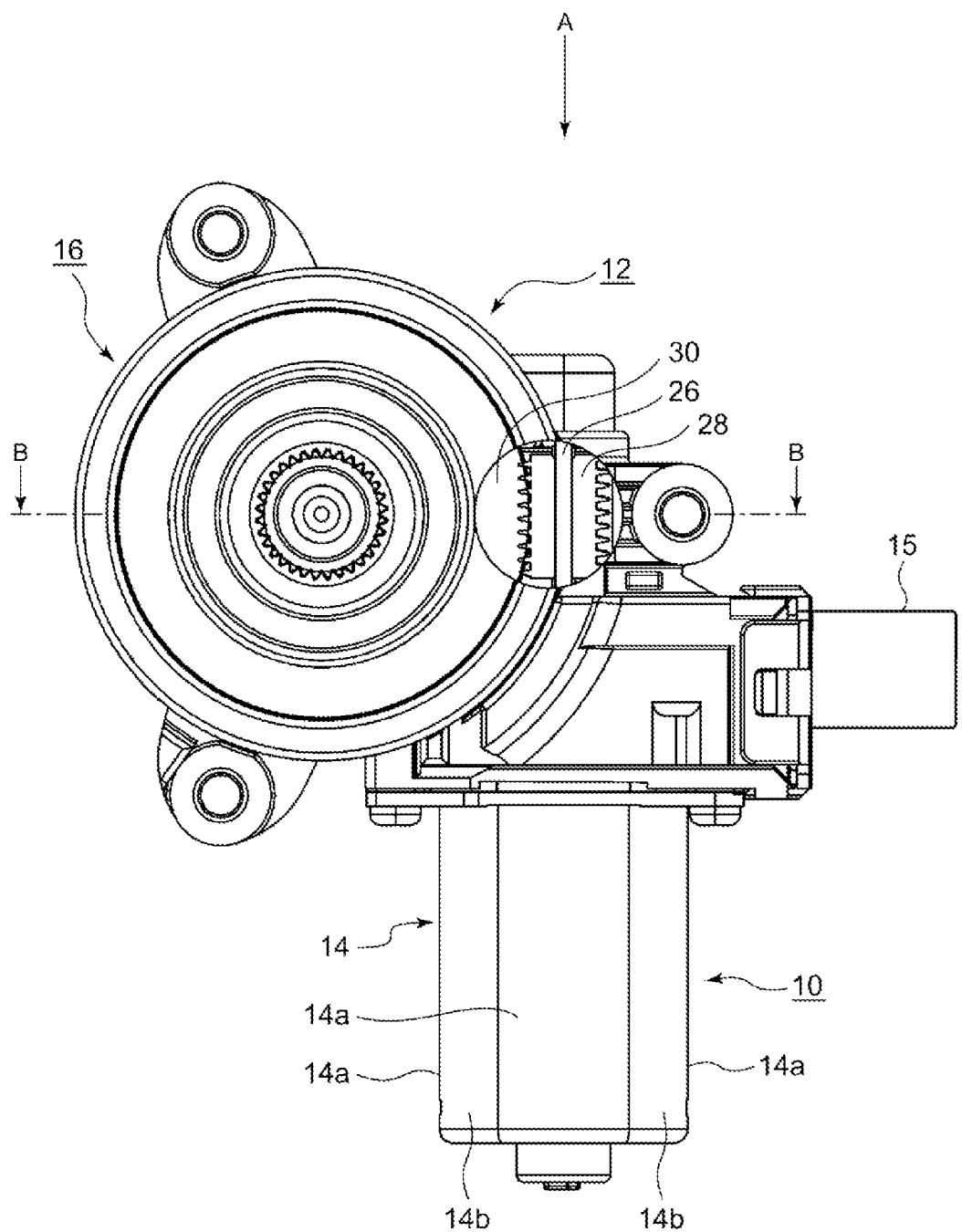
FIG. 1 is a front view of a DC motor with a reducer according to the embodiment as seen from the end of the output shaft.

A worm gear according to at least one embodiment of the present invention comprises a worm formed with a through hole through which a shaft transmitting the rotation of a motor is inserted, and a worm wheel configured to mesh with the worm and transmit the rotation to an output shaft. Given that a normal pitch is denoted by E and a width of a recess in the direction of a worm axis by H, the worm is configured such that (expression 1) $H/E \geq 0.6$ is met.

According to the embodiment, the lubricant located between the worm and the worm wheel is properly maintained.

Another embodiment of the present invention also relates to a worm gear. The worm gear includes a worm formed with a through hole through which a shaft transmitting the rotation of a motor is inserted, and a worm wheel configured to mesh with the worm and transmit the rotation to an output shaft. Given that a normal pitch is denoted by E, a radius of a root circle by F, a depth, from the root circle, of a recess formed to extend from the root circle toward a center of a worm axis by G, a width of the recess in the direction of the worm axis by H, and an inner diameter of the through hole by J, the worm is configured such that (expression 1) $H/E \geq 0.6$, expression (2) $(F-J/2) \times 0.25 \geq G \geq E \times 0.1$ are met.

According to this embodiment, a large capacity can be secured for the recess formed to extend from the root circle of the worm toward the center of the worm axis. Therefore, a large quantity of lubricant can be retained between the worm and the worm wheel. Therefore, the lubricant can continue to function stably even if the operating conditions change due to variation in usage environment or abrasion of components.

Still another embodiment of the present invention also relates to a worm gear. The worm gear comprises: a worm formed with a through hole through which a shaft transmitting the rotation of a motor is inserted; and a worm wheel configured to mesh with the worm and transmit the rotation to an output shaft. Given that a normal pitch is denoted by E, a radius of a root circle by F, a depth, from the root circle, of a recess formed to extend from the root circle toward a center of a worm axis by G, a width of the recess in the direction of the worm axis by H, and an inner diameter of the through hole by J, the worm is configured such that (expression 3) $H/E \geq 0.6$, (expression 4) $F-G-J/2 \geq J/3$ are met.

According to this embodiment, a large thickness can be secured between the recess formed to extend from the root circle of the worm toward the center of the worm axis and the through hole. Therefore, the press-in force between the worm gear and the shaft is increased.

The worm wheel may be formed of a resin material, and the worm may be formed of a metallic material. A resin material is easy to be molded but leaves room for improvement in the strength. However, by forming the worm of a metallic material and ensuring that the normal pitch of the worm is large, it is ensured that the thickness of the tooth of the worm wheel is large. Accordingly, a resin material can be used to form the worm wheel.

The worm wheel may be integrated with the output shaft. This can eliminate the need for a buffer member required if the worm wheel and the output shaft are formed as separate members and inserted between the worm wheel and the output shaft, thereby reducing the number of components.

The invention will now be described by reference to the preferred embodiments. This does not intend to limit the scope of the present invention, but to exemplify the invention.

The reducer according to the present invention is applicable to a device for moving an object by decelerating the motor. For example, the reducer will be suitably used in devices such as a power window system, a sunroof, a power seat, a door closure, etc. of a vehicle. The reducer according to the invention is configured such that the built-in worm gear can be driven to a normal rotation or reverse rotation.

A description will now be given of the embodiment of the present invention with reference to the drawings. Like numerals represent like elements so that the description will be omitted accordingly. The features described below are by way of non-limiting examples only.

First Embodiment

FIG. 1 is a front view of a DC motor 100 with a reducer according to the embodiment as seen from the end of the output shaft. FIG. 1 shows a part of the casing as cutaway view so that the gear mesh between the worm and the worm wheel described later is visible.

The DC motor with a reducer is provided with a motor unit 10 and a reducer 12 connected to the shaft of the motor unit 10. The motor unit 10 is provided with a cylindrical housing 14 and a connector 15 for feeding power from outside the motor. The housing 14 is provided with two pairs of flat surfaces 14a opposite to each other and a plurality of connecting surfaces 14b each connecting the flat surfaces 14a. The housing 14 may not be provided with connecting surface and may be a rectangular housing formed of two pairs of flat surfaces. The reducer 12 is provided with a cylindrical casing 16 for accommodating the worm wheel described later.

Figure 2:
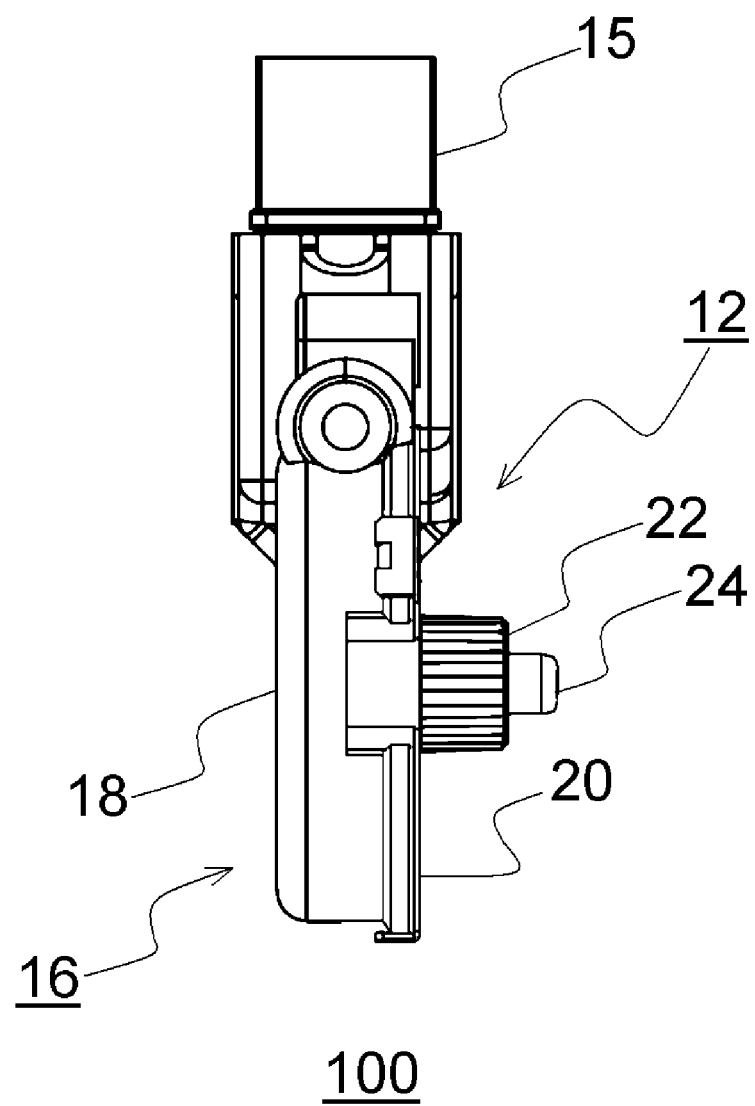
FIG. 2 is a side view of the DC motor with a reducer shown in FIG. 1 as seen in direction A.
Figure 3:
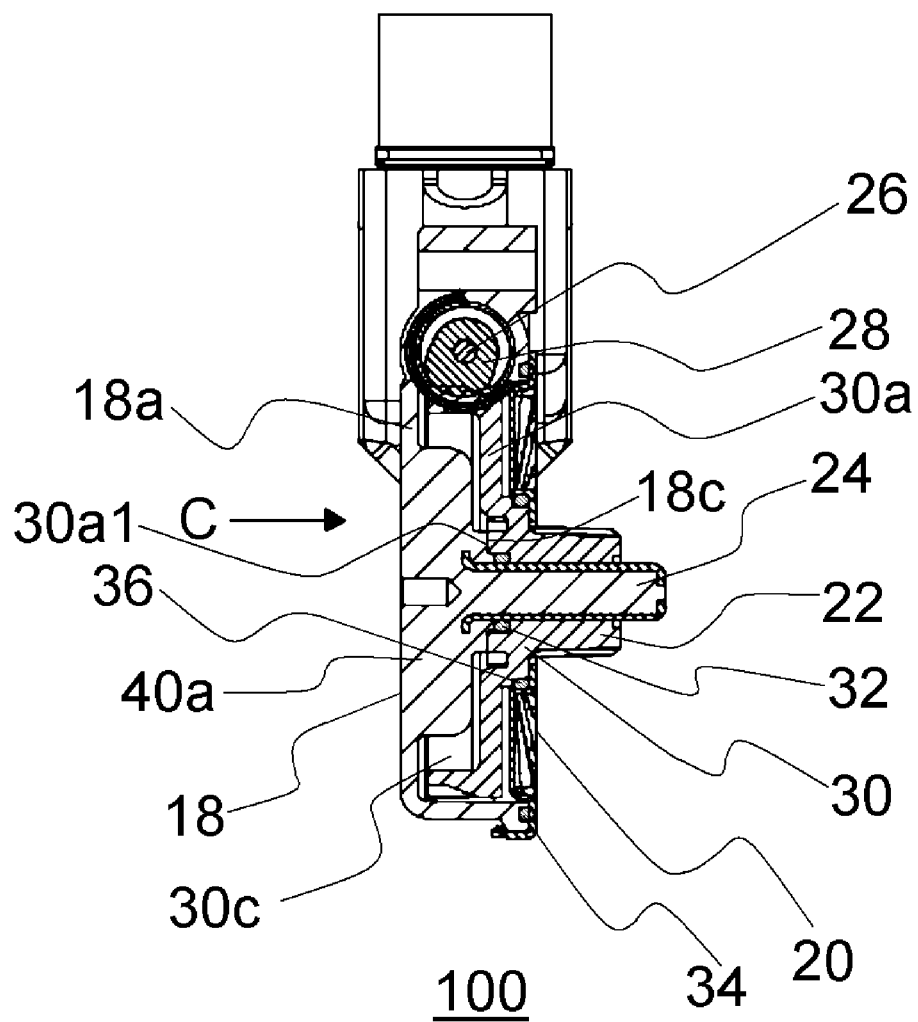
FIG. 3 shows a B-B section of the DC motor with a reducer shown in FIG. 1.

FIG. 2 is a side view of the DC motor 100 with a reducer shown in FIG. 1 as seen in direction A. FIG. 3 shows a B-B section of the DC motor 100 with a reducer shown in FIG. 1.

As shown in FIG. 2, the casing 16 is provided with a gear case body 18 and a cover 20. A circular opening is formed at the center of the cover 20. An output shaft 22 and a fixed shaft 24 rotatably supporting the output shaft 22 project outside the casing 16 from the opening. The fixed shaft 24 is secured to the gear case body 18 as shown in FIG. 3.

The gear case body 18 accommodates a worm 28 and a worm wheel 30, the worm 28 being secured to a shaft 26 of the motor unit 10. A through hole thorough which the shaft 26 is inserted is formed in the worm 28. The rotation of the motor unit 10 is transmitted to the worm 28 via the shaft 26. The worm wheel 30 is configured to mesh with the worm 28 and transmit the rotation to the output shaft 22. The worm wheel 30 is rotatably supported by the fixed shaft 24 secured to the gear case body 18.

An O ring 32 is sandwiched between the fixed shaft 24 and the worm wheel 30 so as to prevent foreign materials or moisture from entering the gear part from outside the motor. The cover 20 is set in the gear case body 18 so as to sandwich an O ring 34 and an O ring 36 between the cover 20 and the gear case body 18. The gear case body 18 is provided with an opposite part 18a opposite to a circular flange part 30a of the worm wheel 30.

Thus, the worm gear according to the embodiment is provided with a worm formed with a through hole through which the shaft 26 transmitting the rotation of the motor is inserted.

Figure 4:
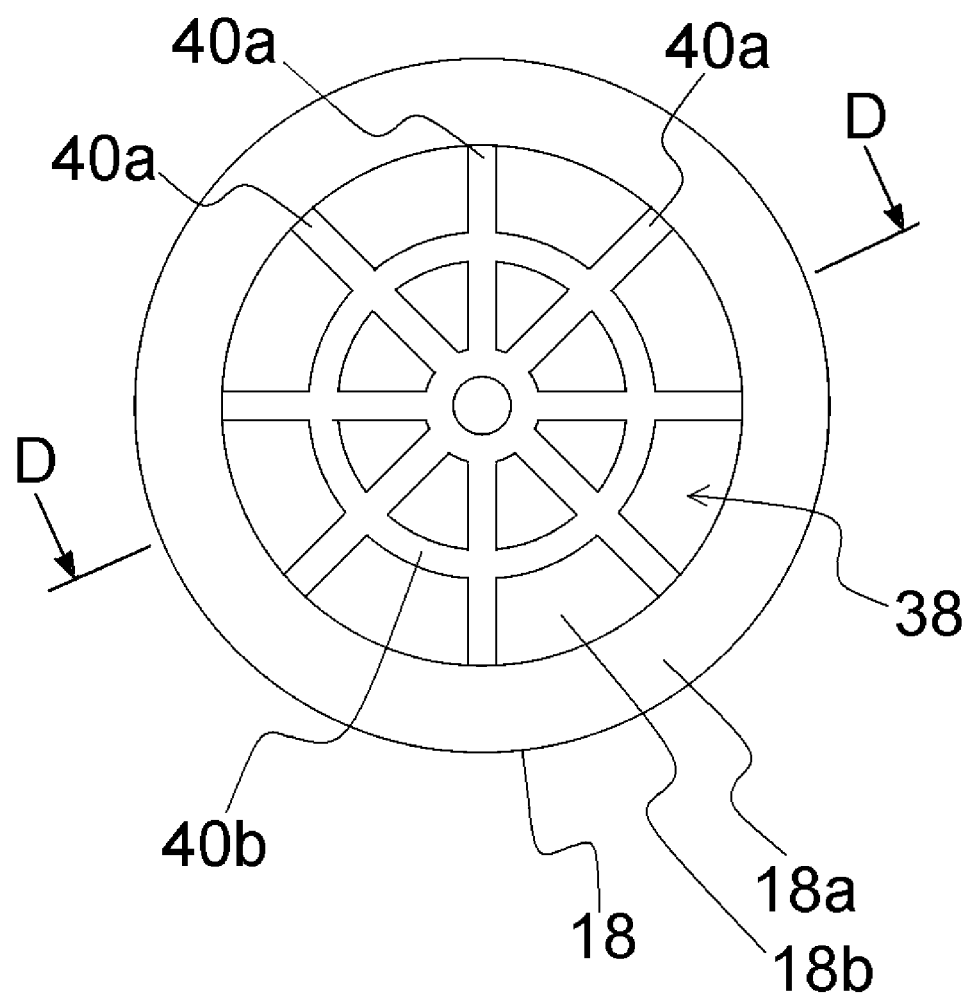
FIG. 4 is a bottom view of the gear case body obtained when the reducer shown in FIG. 3 is seen in direction C.
Figure 5:
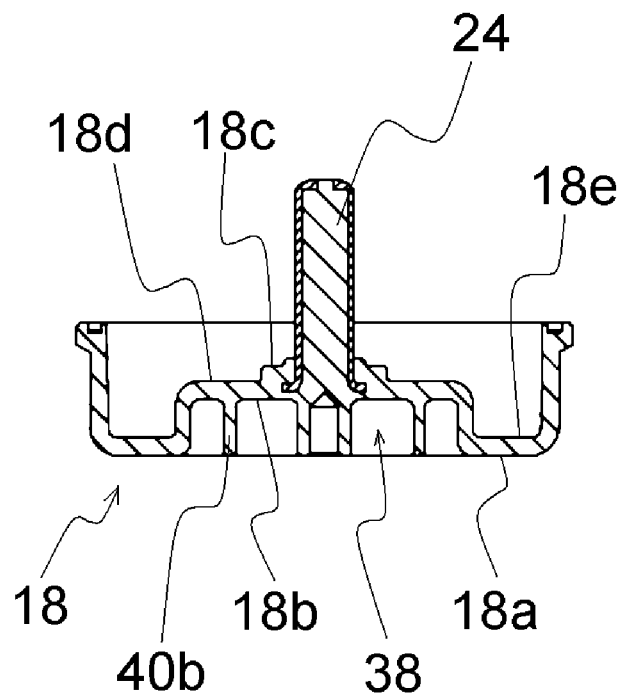
FIG. 5 is a sectional view of the gear case body shown in FIG. 4 in direction D.

FIG. 4 is a bottom view of the gear case body obtained when the reducer shown in FIG. 3 is seen in direction C. FIG. 5 is a sectional view of the gear case body shown in FIG. 4 in direction D. As show in FIGS. 4 and 5, a casing recess 38 concave toward the interior of the casing is formed at the center of the circular opposite part 18a of the gear case body 18. A plurality of radially arranged ribs 40a and an annular rib 40b are provided in the casing recess 38. The ribs 40a and 40b improve the strength of the casing 16. By forming the casing recess 38 concave toward the interior of the casing in the opposite part 18a defining the bottom of the gear case body 18 and providing ribs in the casing recess 38, the strength of the casing 16 of the reducer 12 is improved, and the thickness of the casing 16, and, ultimately, of the reducer 12, is reduced, as compared with the case where the ribs are provided to face outside the casing.

Figure 6:
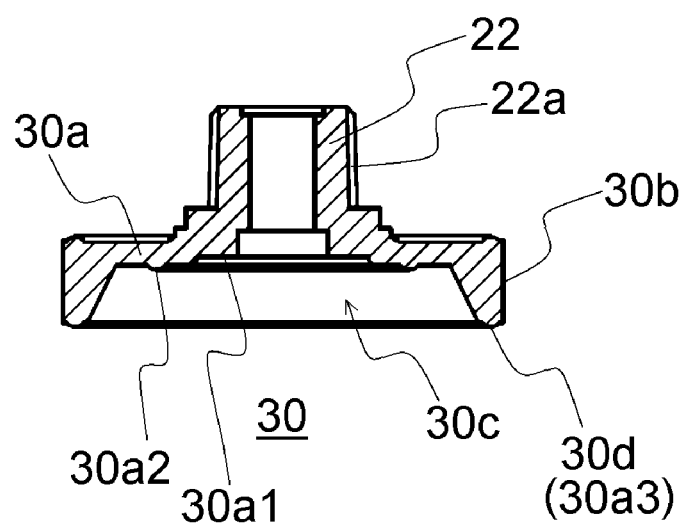
FIG. 6 is a sectional view of the worm wheel according to the first embodiment.
Figure 7A:
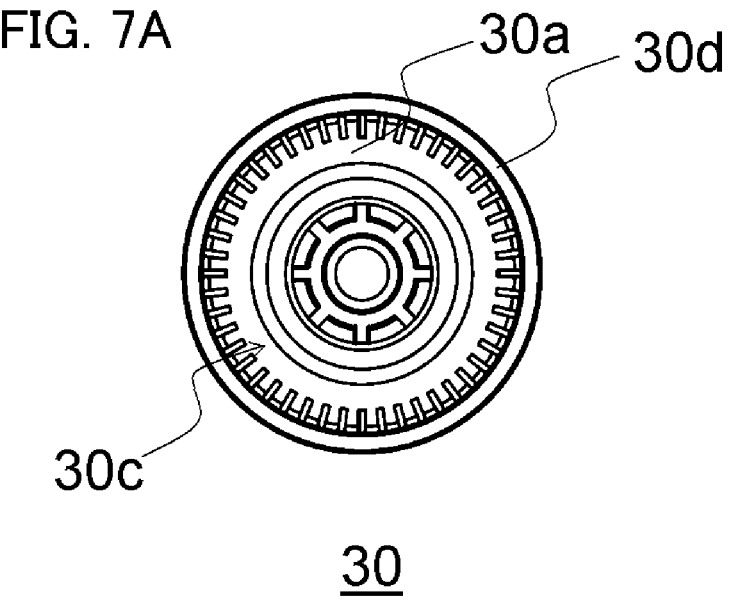
FIG. 7A is a bottom view of the worm wheel according to the first embodiment.
Figure 7B:
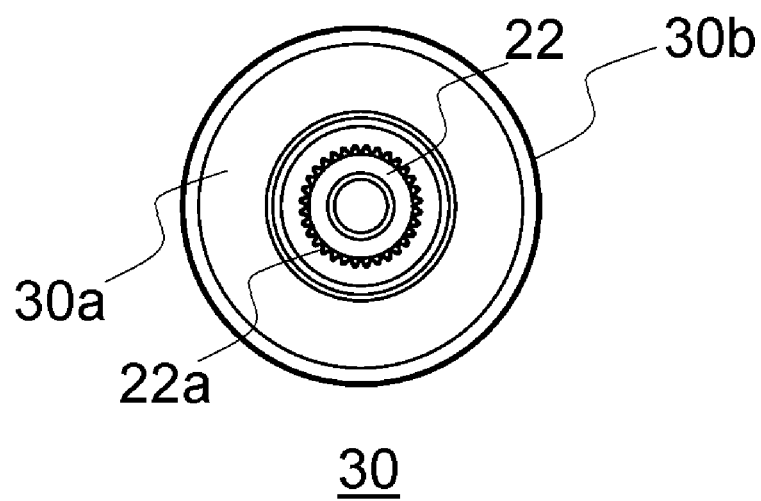
FIG. 7B is a top view of the worm wheel according to the first embodiment.

A detailed description will now be given of the worm wheel 30. FIG. 6 is a sectional view of the worm wheel 30 according to the first embodiment. FIG. 7A is a bottom view of the worm wheel 30 according to the first embodiment, and FIG. 7B is a top view of the worm wheel 30 according to the first embodiment.

As shown in the figures, the worm wheel 30 has a cylindrical shape. The output shaft 22 (small-diameter part) is provided at the end of the worm wheel 30. A tooth 22a that meshes with a rotating member (e.g., a cable drum) connected to the device subject to driving is formed on the outer circumference of the output shaft 22. A tooth 30b that meshes with the worm 28 is formed on the outer circumference of the large-diameter part of the worm wheel 30. The shape of the tooth 30b is omitted in the figures. The shape is non-limiting so long as the worm wheel 30 can be rotated, in mesh with the worm 28. For example, the tooth 30b may be formed as a helical gear. The tooth surface of the worm 28 may be flat. Similarly, the tooth surface of the worm wheel 30 may also be flat.

A flange recess 30c is provided at the center of the flange part 30a. As shown in FIG. 3, the flange recess 30c is concave toward the output shaft with respect to an end surface 30d of the tooth 30b. The end surface 30d is an annular part opposite to the opposite part 18a of the gear case body 18. Further, as shown in FIG. 3, parts of the ribs 40a are located in the flange recess 30c. This ensures that the ribs 40a enter the flange recess 30c without interfering with the flange part 30a so that the opposite part 18a of the gear case body 18 and the worm wheel 30 can be brought to a closer distance and the thickness of the casing 16 is reduced as a whole.

The surface of a bottom 18b of the casing recess 38 according to the embodiment toward the output shaft defines a first sliding surface 18c that slides against a first sliding portion 30a1 of the flange part 30a. The first sliding portion 30a1 is formed on the bottom of the flange recess 30c.

The worm wheel 30 may slide against the gear case body 18 in a variety of other manners. For example, the worm wheel 30 may be provided with a second sliding portion 30a2 (see FIG. 6) that slides against a second sliding surface 18d of the casing recess 38 shown in FIG. 5. The second sliding surface 18d of the casing recess 38 is formed radially outward from the first sliding surface 18c. The second sliding portion 30a2 of the worm wheel 30 is formed on the bottom of the flange recess 30c and at a region radially outward from the first sliding portion 30a1. The worm wheel 30 may be provided with a third sliding portion 30a3 (see FIG. 6) that slides against a third sliding surface 18e of the opposite part 18a shown in FIG. 5 toward the worm wheel. According to the embodiment, the third sliding portion 30a3 corresponds to the end surface 30d.

Not one but a plurality of sliding portions of the worm wheel 30 may slide against the gear case body 18. The number of sliding portions may be selected as appropriate by allowing for vibration, noise, durability, etc. For example, the first sliding portion 30a1 and the second sliding portion 30a2 of the worm wheel 30 may slide against the gear case body 18. Alternatively, the first sliding portion 30a1 or the second sliding portion 30a2, plus the third sliding portion 30a3 of the worm wheel 30 may slide against the gear case body 18.

The worm wheel 30 according to the embodiment is integrated with the output shaft 22. This can eliminate the need for a buffer member required if the worm wheel and the output shaft are formed as separate members and inserted between the worm wheel and the output shaft, thereby reducing the number of components.

The module of the worm gear is preferably 0.5-0.8. The diameter of the shaft is preferably φ3.0-5.0 mm. This is because, if the shaft diameter is too small, the shaft will be warped while the motor is being driven. If the shaft diameter is too large, it will defeat the purpose of reducing the motor weight.

Since the DC motor 100 with a reducer according to the embodiment is configured such that the motor unit 10 is provided with the housing 14 having two opposite pairs of flat surfaces, the thickness of the motor is reduced in comparison with the motor provided with a cylindrical housing. At least one flat surface 14a of the two opposite pairs of flat surfaces is parallel with the opposite part 18a of the gear case body 18. This further reduces the thickness of the DC motor 100 with a reducer. The fact that the housing 14 of the motor unit 10 has four flat surfaces 14a expands a selection of layouts and enables efficient use of the space. For example, components other than the housing (e.g., engine control units (ECU) or the ferrite core for attenuation of electric noise) can be fixed on the flat surface or provided in close proximity thereof.

Figure 8:
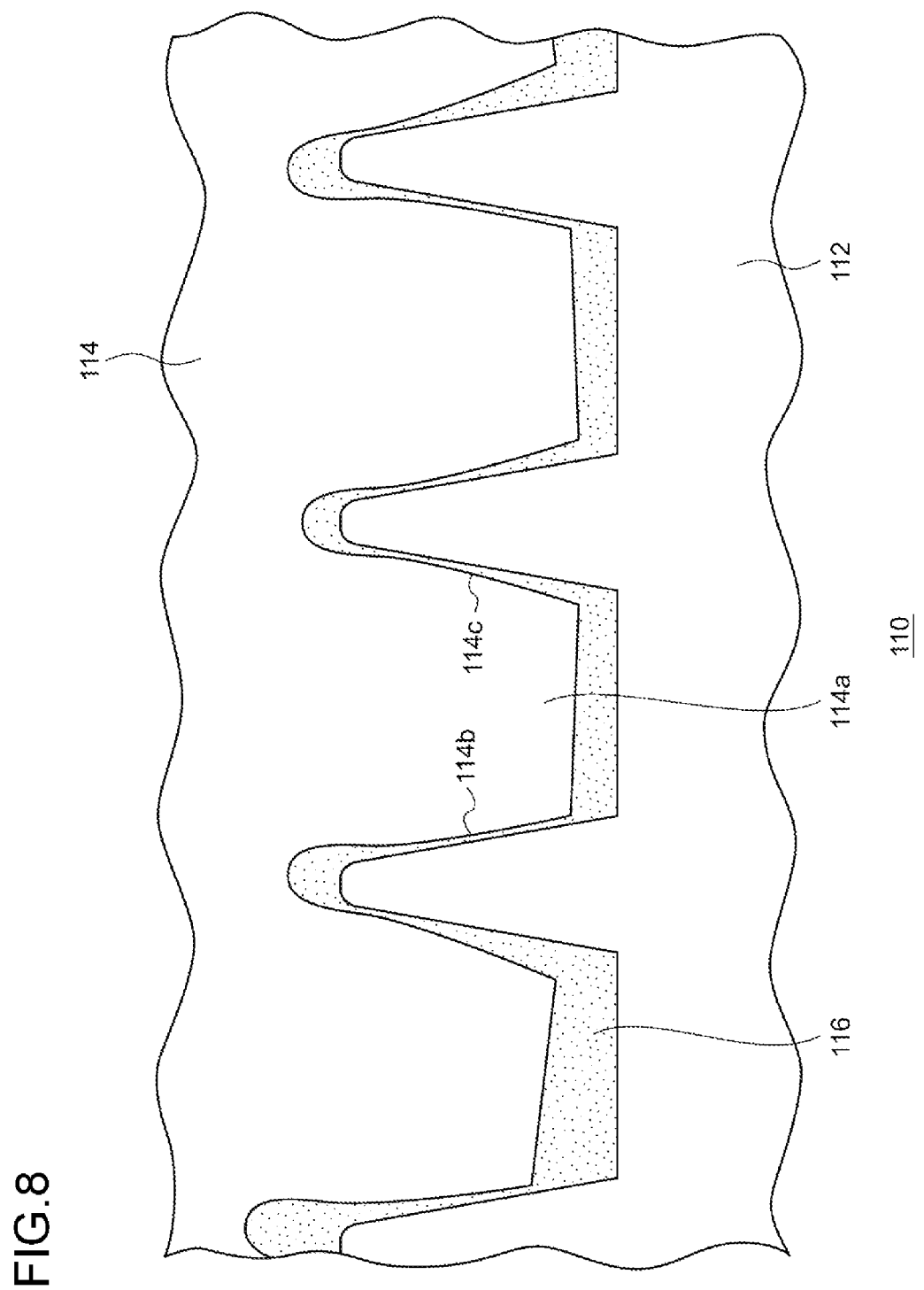
FIG. 8 is an enlarged view of an important part of the gear mesh of a worm gear.

A lubricant such as grease is provided between the worm and the worm wheel constituting the worm gear in order to mitigate abrasion on the tooth faces. FIG. 8 is an enlarged view of an important part of the gear mesh of a worm gear 110. FIG. 8 shows where grease 116 is located in an intermediate state in which the tooth surfaces of a worm 112 and the tooth surfaces of a worm wheel 114 are not in contact with each other. As shown in FIG. 8, the grease 116 is located evenly on a left side 114b of a tooth 114a of the worm wheel 114 and on a right side 114c thereof, when the worm gear 110 is not being driven.

Figure 9:
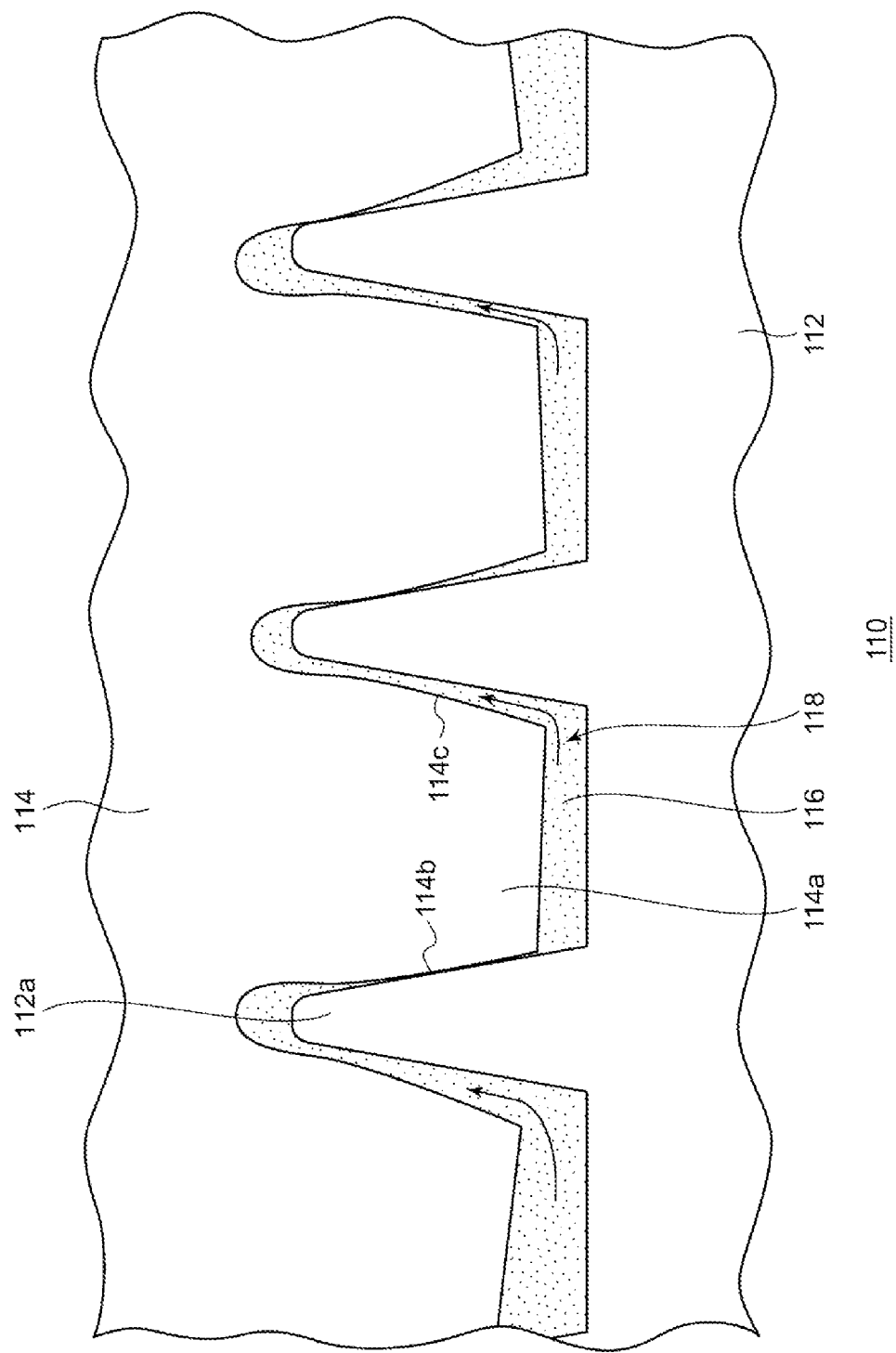
FIG. 9 shows where in the gear mesh of the worm gear the grease is located while the motor is being driven to a reverse rotation.

FIG. 9 shows where in the gear mesh of the worm gear 110 the grease is located while the motor is being driven to a reverse rotation. As shown in FIG. 9, the right side of a tooth 112a of the worm 112 and the left side of a tooth 114a of the worm wheel 114 are in contact with each other while the motor is being driven to a reverse rotation. This reduces the thickness of the grease 116 at the gear mesh. The grease 116 with a reduced thickness will flow to the right side 114c of the tooth 114a of the worm wheel 114 via a grease pool 118 of the worm 112.

Figure 10:
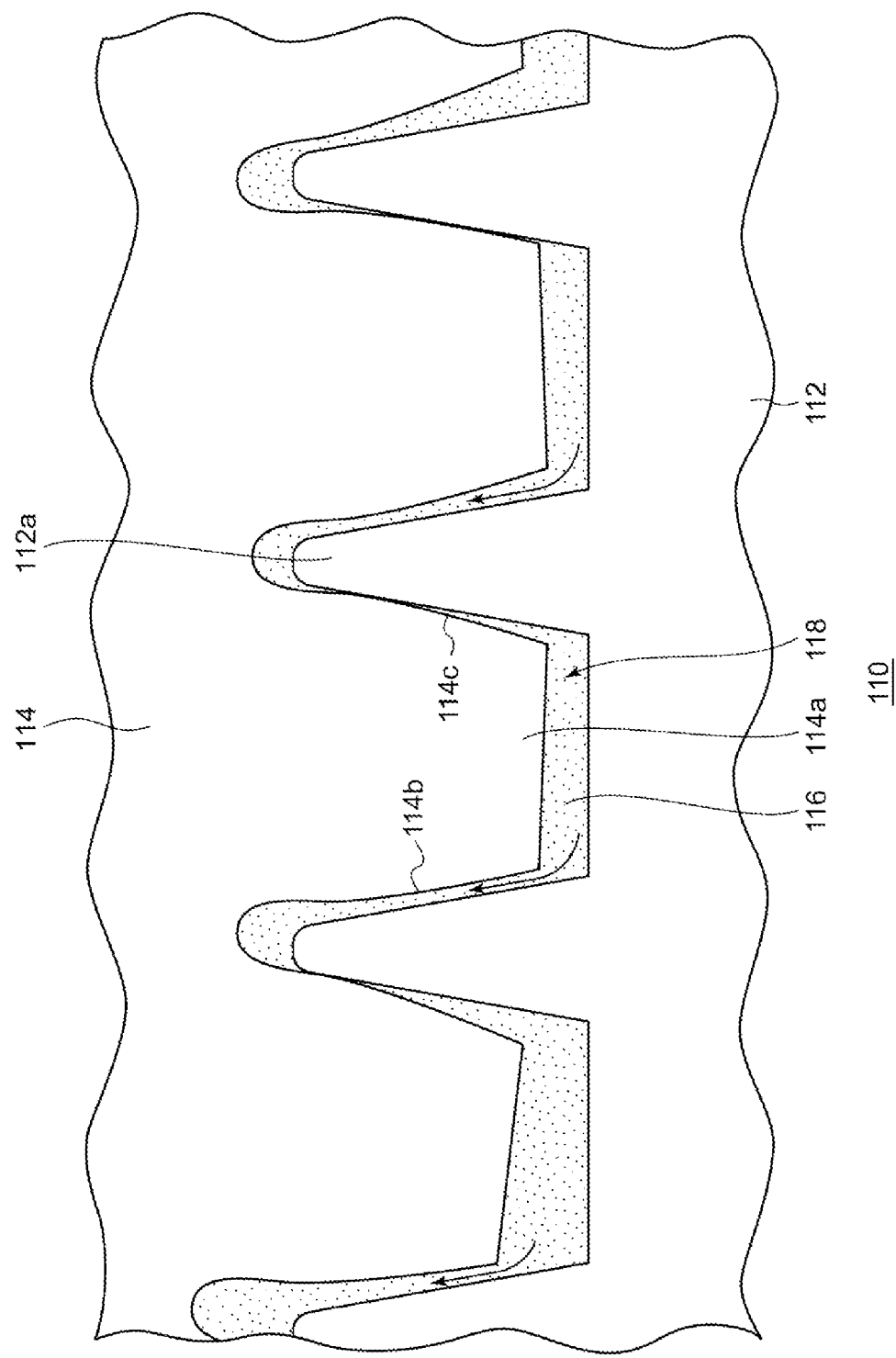
FIG. 10 shows where in the gear mesh of the worm gear the grease is located while the motor is being driven to a normal rotation.

FIG. 10 shows where in the gear mesh of the worm gear 110 the grease is located while the motor is being driven to a normal rotation. As shown in FIG. 10, the left side of the tooth 112a of the worm 112 and the right side of the tooth 114a of the worm wheel 114 are in contact with each other while the motor is being driven to a normal rotation. This reduces the thickness of the grease 116 at the gear mesh. The grease 116 with a reduced thickness will flow to the left side 114b of the tooth 114a of the worm wheel 114 via the grease pool 118 of the worm 112.

While the motor is used in a normal temperature, a proper backlash exists between the tooth 112a of the worm 112 and the tooth 114a of the worm wheel 114. Therefore, the aforementioned flow of grease can be maintained. However, if the worm wheel 114 is made of a resin material and the worm 112 is made of a metallic material, and if the worm gear 110 is used in a high-temperature environment, the amount of expansion of the worm wheel 114 will be larger than that of the worm 112 since resin has higher coefficient of thermal expansion than metal. Accordingly, the backlash will be reduced.

This causes the grease 116 located at the gear mesh to overflow to other parts. The other parts include the longitudinal ends of the worm 112 and those parts between the worm 112 and the worm wheel 114 other than the gear mesh of the worm 112 and the worm wheel 114. The grease that overflows to these parts remains there and does not return to the gear mesh. Therefore, the grease will no longer function as a lubricant and become wasted. In addition, the grease will be degraded with the elapse of time. For this reason, the percentage of the grease that functions properly as a lubricant will be reduced.

Accordingly, the worm of the worm gear according to the embodiment is uniquely shaped so that the grease pool 118 has a large capacity and can retain the grease in large quantity. One conceivable approach to increase the capacity of the grease pool 118 would be to increase the depth of the grease pool toward bottom of the tooth of the worm 112. However, the depth cannot simply be increased due to the concern for the strength of the worm. In particular, if the worm and the shaft are separate, and if the thickness of the worm axis is small, the worm may be easily deformed so that the depth of the grease pool can be increased only to a limited degree.

In the worm 112 according to the embodiment, the thickness of the tooth 112a is reduced and the area between a given tooth 112a and the adjacent tooth 112a is expanded. In addition, a recess that is not so deep is formed to extend from the root circle of the worm 112 toward the center of the worm axis.

Figure 11:
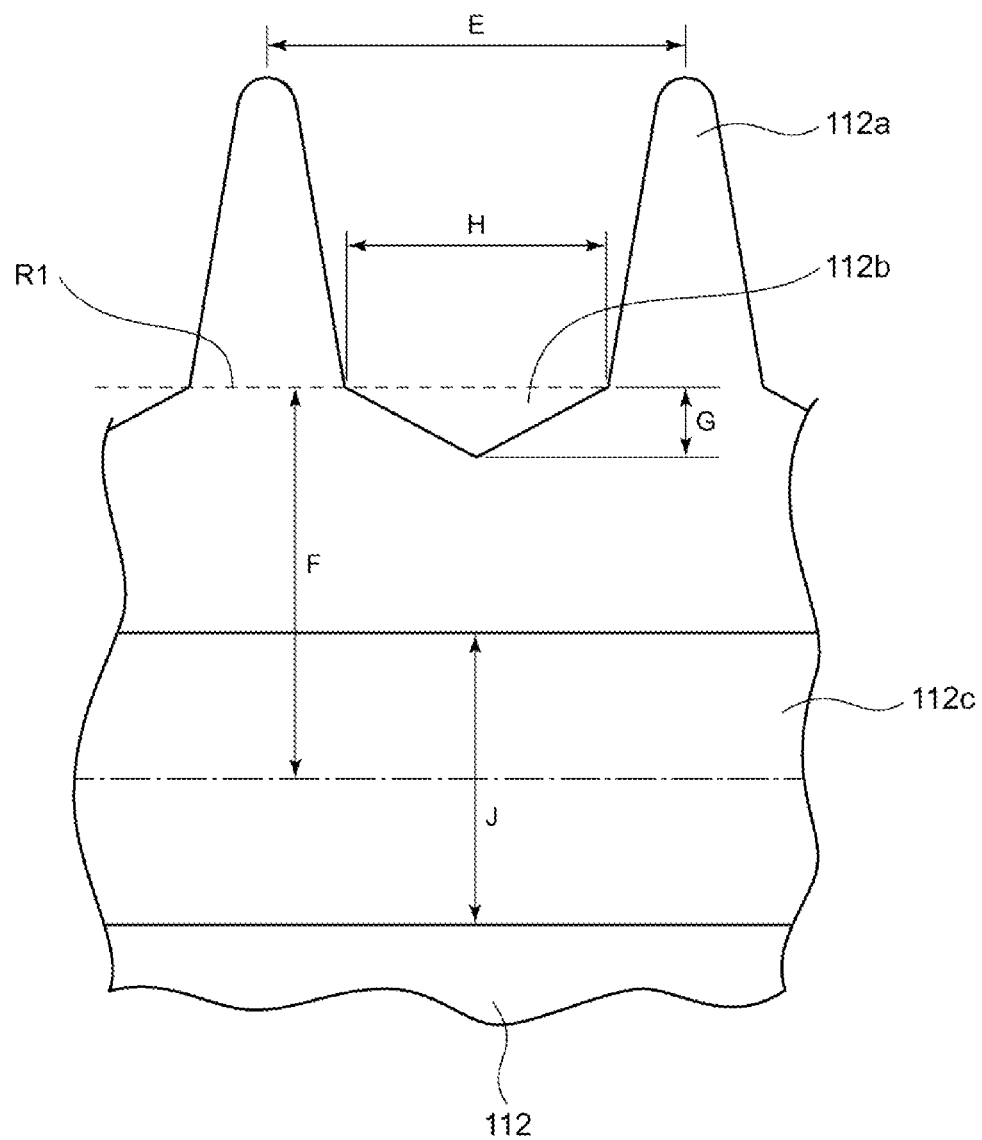
FIG. 11 is an enlarged view of the neighborhood of the grease pool of the worm according to the embodiment.

FIG. 11 is an enlarged view of the neighborhood of the grease pool of the worm according to the embodiment. FIG. 11 is a view seen in the direction of shaft angle. The following description concerns the optimal size of the grease pool and the associated dimension of the worm.

It will be assumed that the dimension of the worm 112 is such that the normal pitch is denoted by E, the radius of a root circle R1 by F, the depth, from the root circle R1, of a recess 112b formed to extend from the root circle R1 toward the center of the worm axis by G, the width of the recess in the direction of the worm axis by H, and the inner diameter of the through hole by J.

Table 1 shows the dimension of the worm according to exemplary embodiments 1-3 and comparative examples 1 and 2.

TABLE 1

|  | Normal pitch E [mm] | Radius of root circle F [mm] | Depth of recess G [mm] | Width of recess H [mm] | Inner diameter of through hole J [mm] | H/E | (F − J/2) × 0.25 | E × 0.1 | F − G − J/2 | Area of grease pool S [mm$^2$] |
|---|---|---|---|---|---|---|---|---|---|---|
| Comparative example 1 | 2.1 | 5.6 | 0.3 | 0.9 | 4.0 | 0.44 | 0.91 | 0.21 | 3.37 | 0.19 |
| Comparative example 2 | 2.2 | 5.0 | 0.2 | 1.2 | 4.0 | 0.54 | 0.76 | 0.22 | 2.84 | 0.16 |
| Exemplary embodiment 1 | 2.0 | 4.7 | 0.3 | 1.3 | 3.17 | 0.63 | 0.78 | 0.20 | 2.81 | 0.30 |
| Exemplary embodiment 2 | 2.0 | 4.7 | 0.3 | 1.3 | 4.0 | 0.63 | 0.68 | 0.20 | 2.40 | 0.30 |
| Exemplary embodiment 3 | 1.9 | 4.7 | 0.3 | 1.2 | 3.17 | 0.63 | 0.78 | 0.19 | 2.82 | 0.25 |

A description will now be given of the expression for calculating an area S of the grease pool from the dimension of the worm. Table 2 shows the dimension according to the exemplary embodiments 1-3 and the comparative examples 1 and 2 other than that of Table 1.

TABLE 2

|  | Module m | Pressure angle α [°] | Coefficient of transversal shift Xh | Length coefficient of root of tooth hfc | Angle defined by grease pool θ [°] | Area of grease pool S [mm$^2$] |
|---|---|---|---|---|---|---|
| Comparative example 1 | 0.7 | 14.5 | 0.4 | 1.3 | 120 | 0.19 |
| Comparative example 2 | 0.7 | 10 | 0.6 | 1.4 | 140 | 0.16 |
| Exemplary embodiment 1 | 0.65 | 10 | 0.9 | 1.6 | 120 | 0.30 |
| Exemplary embodiment 2 | 0.65 | 10 | 0.9 | 1.6 | 120 | 0.30 |
| Exemplary embodiment 3 | 0.6 | 10 | 0.9 | 1.6 | 120 | 0.25 |

Figure 12A:
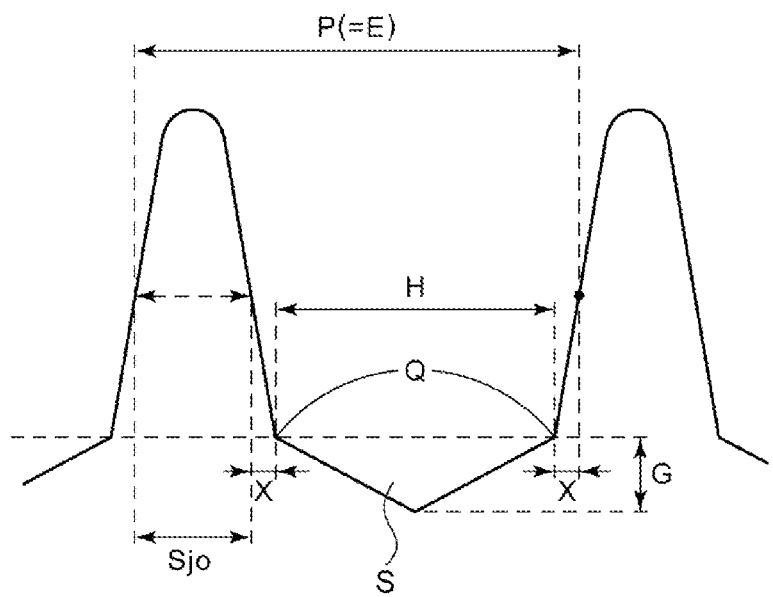
FIGS. 12A-12C are schematic diagrams that illustrate the expression for calculating the area S of the grease pool.
Figure 12B:
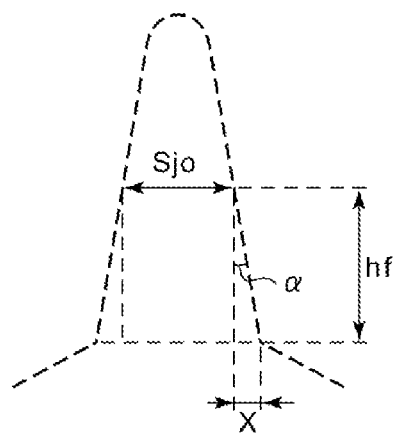
Figure 12C:
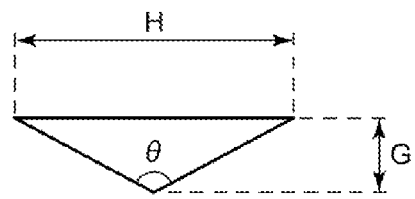

FIGS. 12A-12C are schematic diagrams that illustrate the expression for calculating the area S of the grease pool.

Given that the module is denoted by m, the normal pitch P (=E) shown in FIG. 12A is given by expression (5).

$$P=\pi \times m \quad (5)$$

Given that the coefficient of transversal shift is denoted by Xh, the design chordal tooth thickness $S_{jo}$ shown in FIG. 12A is given by expression (6).

$$S_{jo}=p/2+m\times Xh \quad (6)$$

Given that the length coefficient hfc of the root of the tooth is denoted by hfc, the length hf of the root of the tooth shown in FIG. 12B is given by expression (7).

$$hf=m\times hfc \quad (7)$$

Given that the pressure angle is denoted by α, the width X shown in FIG. 12B is given by expression (8).

$$X=hf\times \tan \alpha \quad (8)$$

The normal pitch P is given by expression (9).

$$P=S_{jo}+X+H+X \quad (9)$$

Therefore, based on expressions (8) and (9), the width H of the recess is given by $$H=P-S_{jo}-2X=P-S_{jo}-2hf\times \tan \alpha \quad (10)$$

Meanwhile, given that the angle defined by the grease pool (recess) shown in FIG. 12A is denoted by θ, the depth G of the recess is given by $$G=H/(2\tan(\theta/2)) \quad (11)$$

Based on the foregoing, the area S of the angle formed by the grease pool is given by $$S=(G\times H)/2=(m^2/(4\tan(\theta/2)))\times(\pi/2-Xh-2hfc^*\tan \alpha)^2 \quad (12)$$

This expression (12) calculates the area S of the grease pool according to the exemplary embodiments and the comparative examples.

In the exemplary embodiments, the area S of the grease pool is relatively large so that the lubricant is considered to be maintained properly. Preferably, the area of the grease pool is 0.20 [mm²] or more.

The results shown in Table 1 teach that the dimension of the worm should preferably be configured such that H/E≥0.6 (1) and (F−J/2)×0.25≥G≥E×0.1 are met.

By configuring the dimension of the worm such that expressions (1) and (2) above are met, a large capacity can be secured for the recess 112b formed to extend from the root circle R1 of the worm 112 toward the center of the worm axis. Therefore, a large quantity of lubricant can be retained between the worm 112 and the worm wheel 114. Therefore, the lubricant can continue to function stably even if the operating conditions change due to variation in usage environment or abrasion of components.

The results shown in Table 1 also teach that the dimension of the worm should preferably be configured such that H/E≥0.6 (3) and F−G−J/2≥J/3 (4) are met.

By configuring the dimension of the worm such that expressions (3) and (4) above are met, a large thickness can be secured between the recess 112b formed to extend from the root circle R1 of the worm 112 toward the center of the worm axis and the through hole 112c. Therefore, the strength of the worm 112 is increased accordingly.

More preferably, the dimension of the worm is configured such that H/E≥0.6 (1), (F−J/2)×0.25≥G≥E×0.1 (2), and F−G−J/2≥J/3 (4) are met.

Figure 13:
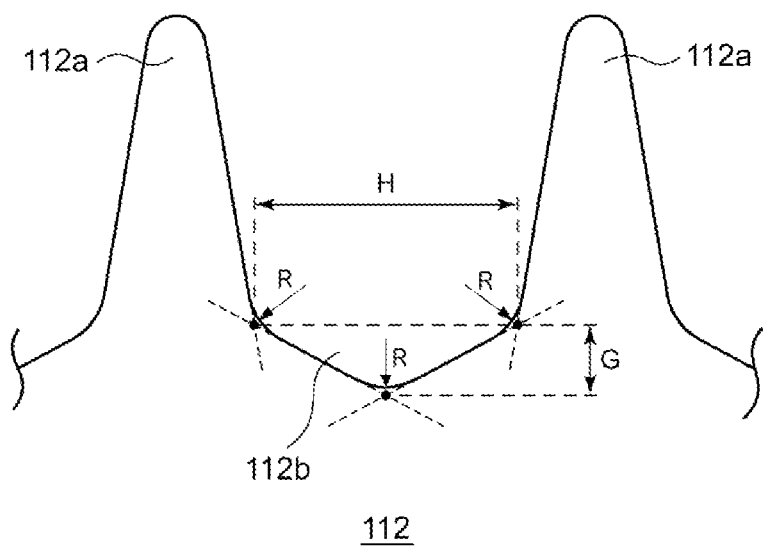
FIG. 13 illustrates an alternative embodiment of the grease pool.

In the description given above, the recess as a grease pool is assumed to have a triangular cross section bounded by straight lines, but the shape is non-limiting. FIG. 13 illustrates an alternative embodiment of the grease pool. As shown in FIG. 13, the neighborhood of the corners the recess 112b of the worm 112 is rounded in some cases depending on the method or precision of work. In this case, the intersection between the extension of the flat part of the tooth 112a and the extension of the flat part of the bottom of the recess 112b may be defined as the vertex of the triangle.

Figure 14:
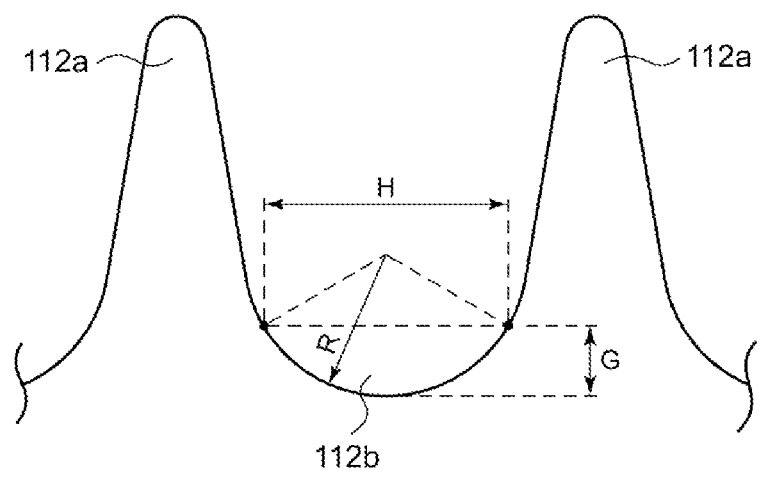
FIG. 14 illustrates still another embodiment of the grease pool.

FIG. 14 illustrates still another embodiment of the grease pool. The recess 112b shown in FIG. 14 as a grease pool is arc-shaped. The area S of the grease pool can be calculated mathematically in this case as in the foregoing case.

Figure 15:
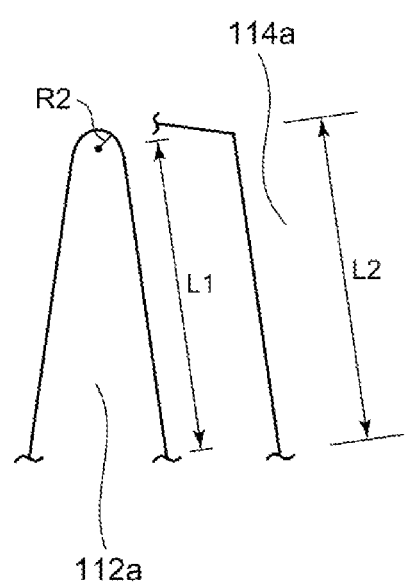
FIG. 15 schematically illustrates the working range of meshing of tooth surfaces.

A description will now be given of the working range of meshing of tooth surfaces of the worm and the worm wheel. FIG. 15 schematically illustrates the working range of meshing of tooth surfaces. The length of the working range of meshing of the tooth 112a of the worm 112 is denoted by L1, and the length of the working range of meshing of the tooth 114a of the worm wheel 114 is denoted by L2. Table 3 lists the values of L1/L2 of the worm wheels according to the exemplary embodiments 1-3 and the comparative examples 1 and 2, and the values of the tooth tip R2 of the worm.

TABLE 3

|  | L1 [mm] | L2 [mm] | (L1/L2) × 100 [%] | Tooth tip R2 [mm] |
|---|---|---|---|---|
| Comparative example 1 | 1.5 | 1.6 | 90 | 0.2 |
| Comparative example 2 | 1.7 | 1.8 | 91 | 0.2 |
| Exemplary embodiment 2 | 1.5 | 1.6 | 95 | 0.1 |
| Exemplary embodiment 2 | 1.5 | 1.6 | 95 | 0.1 |
| Exemplary embodiment 3 | 1.4 | 1.5 | 93 | 0.1 |

As shown in Table 3, by configuring the tooth tip R2 of the worm according to the exemplary embodiments 1-3 to have a length of less than 0.2 mm, it is ensured that the ratio L1/L2 of meshing of the tooth of the worm and the tooth of the worm wheel is 94% or more. This reduces deformation of the tooth of the worm wheel accordingly.

As discussed above, the worm gear according to the embodiment is formed such that the thickness of the tooth of the worm is thin. This increases the thickness of the tooth of the worm wheel so that the strength of the worm gear is expected to be increased.

By reducing the thickness of the tooth of the worm, a large space is secured at the bottom of the tooth and a large quantity of grease can be retained. Consequently, the volume of the grease is increased so that lubrication and durability at the gear mesh are expected to be improved.

The worm used in the embodiment may be manufactured by rolling and not subject to surface finishing. By eliminating the related-art step for surface finishing, the cost required for the process can be reduced. By manufacturing the worm by through feed thread rolling, the cost is further reduced. Through feed thread rolling is well known as a method of manufacturing a worm. To describe it in further detail, a long iron round bar is prepared and led through a space between two rolling dices in rotation. The round bar is rotated accordingly and formed into the shape of a worm as it leaves the space. The round bar is cut into a predetermined length and a hole is drilled through the cut piece. A worm is produced by fitting the resultant piece to the shaft.

The worm wheel according to the embodiment may be formed of a resin material, and the worm may be formed of a metallic material. A resin material is easy to be molded but leaves room for improvement in the strength. However, by forming the worm of a metallic material and ensuring that the normal pitch of the worm is large, it is ensured that the thickness of the tooth of the worm wheel is large. Accordingly, satisfactory strength can be secured even if a resin material is used to form the worm wheel.

The embodiment described above is non-limiting. Variations such as modifications to the design of the exemplary embodiments can be made on the basis of the knowledge of a skilled person, and the embodiments modified as such will also be within the scope of the present invention.

What is claimed is:

1. A worm gear comprising:
a worm formed with a through hole through which a shaft transmitting the rotation of a motor is inserted, the shaft having a diameter;
a worm wheel configured to mesh with the worm and transmit the rotation to an output shaft; and
a grease pool having an area,
wherein the diameter of the shaft is ϕ3.0-5.0 mm and the area of the grease pool is 0.20 mm$^2$ or more,
wherein the worm wheel is formed of a resin material,
wherein the worm is formed of a metallic material, and
wherein, given that a normal pitch is denoted by E and a width of a recess formed to extend from the root circle toward a center of a worm axis, in the direction of a worm axis by H, the worm is configured such that $$H/E \geq 0.6 \qquad \text{(expression 1)}$$

is met.

2. A worm gear comprising:
a worm formed with a through hole through which a shaft transmitting the rotation of a motor is inserted, the shaft having a diameter;
a worm wheel configured to mesh with the worm and transmit the rotation to an output shaft; and
a grease pool having an area,
wherein the diameter of the shaft is (10.0-5.0 mm and the area of the grease pool is 0.20 mm$^2$ or more,
wherein the worm wheel is formed of a resin material,
wherein the worm is formed of a metallic material, and
wherein, given that a normal pitch is denoted by E, a radius of a root circle by F, a depth, from the root circle, of a recess formed to extend from the root circle toward a center of a worm axis by G, a width of the recess in the direction of the worm axis by H, and an inner diameter of the through hole by J, the worm is configured such that $$H/E \geq 0.6, \qquad \text{(expression 1)}$$

$$(F-J/2) \times 0.25 \geq G \geq E \geq 0.1 \qquad \text{(expression 2)}$$

are met.

3. A worm gear comprising:
a worm formed with a through hole through which a shaft transmitting the rotation of a motor is inserted, the shaft having a diameter;
a worm wheel configured to mesh with the worm and transmit the rotation to an output shaft; and
a grease pool having an area,
wherein the diameter of the shaft is ϕ3.0-5.0 mm and the area of the grease pool is 0.20 mm$^2$ or more,
wherein the worm wheel is formed of a resin material,
wherein the worm is formed of a metallic material, and
wherein, given that a normal pitch is denoted by E, a radius of a root circle by F, a depth, from the root circle, of a recess formed to extend from the root circle toward a center of a worm axis by G, a width of the recess in the direction of the worm axis by H, and an inner diameter of the through hole by J, the worm is configured such that $$H/E \geq 0.6, \qquad \text{(expression 3)}$$

$$F-G-J/2 \geq J/3 \qquad \text{(expression 4)}$$

are met.

4. The worm gear according to claim 1, wherein the worm wheel is integrated with the output shaft.

5. The worm gear according to claim 1, wherein a tooth tip of the worm has a length of less than 0.2 mm.

6. The worm gear according to claim 2, wherein the worm wheel is integrated with the output shaft.

7. The worm gear according to claim 3, wherein the worm wheel is integrated with the output shaft.

8. The worm gear according to claim 2, wherein a tooth tip of the worm has a length of less than 0.2 mm.

9. The worm gear according to claim 3, wherein a tooth tip of the worm has a length of less than 0.2 mm.

10. The worm gear according to claim 4, wherein a tooth tip of the worm has a length of less than 0.2 mm.

* * * * *